United States Patent [19]

Fischer et al.

[11] 3,902,980

[45] Sept. 2, 1975

[54] PRODUCTION OF 3-SULFOPROPIONIC ANHYDRIDE

[75] Inventors: Martin Fischer, Ellerstadt; Karl Eicken, Ludwigshafen, both of Germany

[73] Assignee: BASF Aktiengesellschaft, Ludwigshafen (Rhine), Germany

[22] Filed: Apr. 2, 1974

[21] Appl. No.: 457,578

[52] U.S. Cl............................................. 204/158 R
[51] Int. Cl............................................. B01j 1/10
[58] Field of Search .................. 204/158 HA, 158 R

[56] References Cited
FOREIGN PATENTS OR APPLICATIONS
339,543  6/1972  U.S.S.R................................ 204/158

Primary Examiner—Howard S. Williams
Attorney, Agent, or Firm—Johnston, Keil, Thompson & Shurtleff

[57] ABSTRACT

Production of 3-sulfopropionic anhydride by reaction of propionic acid with chlorine and sulfur dioxide in specific proportions with irradiation. The 3-sulfopropionic anhydride prepared by the process of the invention is a valuable starting material for the production of dyes, pesticides and fibers.

8 Claims, No Drawings

PRODUCTION OF 3-SULFOPROPIONIC ANHYDRIDE

This application discloses and claims subject matter described in German Patent application No. P 2317601.4, filed Apr. 7, 1973 which is incorporated herein by reference.

The invention relates to a process for the production of 3-sulfopropionic anhydride by reaction of propionic acid with chlorine and sulfur dioxide in specific proportions with exposure of light.

It is known from a publication in Bull. Chem. Soc. Japan, 44 (1971), 2771 et seq., that sulfopropionic anhydride is formed, with exposure to light, from propionic acid, chlorine and sulfur dioxide, chlorine being used, with reference to propionic acid, in an equimolar amount or in excess and sulfur dioxide being used in a molar ratio to propionic acid of 6:1. At the reaction temperature of 70°C a heterogeneous mixture of different chloropropionic acids is thus formed, sometimes in an appreciable amount. The disadvantages of the method (for example only moderate yields of anhydride, the proportion of chloropropionic acids in a comparable total yield and the difficulty in obtaining a pure end product, i.e., the troublesome and expensive purification operations) do not permit economical, simple and reliable operation on an industrial scale.

The object of the invention is a new process for the production of 3-sulfopropionic anhydride in better yields and higher purity by a simpler and more economical method.

We have now found that 3-sulfopropionic anhydride is advantageously obtained in the reaction of propionic acid with chlorine and sulfur dioxide with exposure to light having a wavelength of from 1,800 to 8,000 A by carrying out the reaction with an amount of less than 1 mole of chlorine per mole of propionic acid and with an amount of sulfur dioxide by weight which is from 0.95 to 7 times the weight of chlorine.

We have also found that the reaction is advantageously carried out in a first stage with exposure to light at a temperature of from −20° to +50°C and in a second stage without exposure to light at a temperature above 50°C.

In an advantageous embodiment the reaction mixture obtained in the reaction is advantageously adjusted to a concentration of up to 40 percent by weight of end product, the mixture cooled to a temperature of from +30° to −25°C and the crystalline end product thus formed is separated.

In another advantageous embodiment the reaction mixture obtained in the reaction or the filtrate obtained after separation of the portion of the end product which has crystallized out is distilled, distillation being carried out at subatmospheric pressure and a temperature of less than 150°C by one-pass evaporation, thin-layer evaporation, falling film evaporation or molecular distillation.

The reaction may be represented by the following equation:

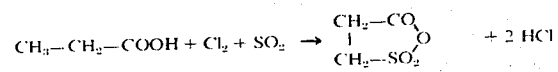

Compared with prior art methods the process according to the invention surprisingly gives 3-sulfopropionic anhydride in a better yield and higher purity by a simpler and more economical method. α-chloropropionic acid is substantially the only byproduct and the formation of a heterogeneous mixture of different chlorinated carboxylic acids and the consequent troublesome purification procedure involved are avoided.

The reaction is carried out continuously or batchwise and at atmospheric or superatmospheric pressure with chlorine in an amount of less than 1 mole and advantageously from 0.3 to 0.95 mole and preferably from 0.45 to 0.9 mole per mole of propionic acid and an amount of sulfur dioxide which is from 0.95 to 7 times and preferably from once to 4 times the weight of the chlorine. The temperatures used are generally from −30° to +130°C and preferably from +30° to +90°C and particularly from 50° to 90°C. In a preferred embodiment the reaction is carried out in two stages, in the first stage with exposure to light and generally at a temperature of not more than 50°C, preferably from −20° to +50°C and particularly from 0° to +40°C, and then in a second stage without exposure to light and generally at a temperature above 50°C and preferably of from 60° to 80°C. Organic solvents which are inert under the reaction conditions, e.g. chlorohydrocarbons, for example carbon tetrachloride, tetrachloroethane, methylene chloride, chloroform, dichlorobenzene or mixtures thereof, may be used, conveniently in an amount of from 10 to 90 percent by weight, based on propionic acid.

Light sources emitting light having a wavelength of from 1,800 to 8,000 A and preferably of from 2,500 to 4,500 A are suitable for the irradiation. The source may be sunlight or artificial light, for example from tungsten lamps, xenon lamps, graphite arcs, carbon arcs, fluorescent lamps, daylight lamps, argon incandescent lamps, floodlight lamps, fluorescent tubes, broad light source lamps, and low and high pressure mercury vapor lamps which may if desired be doped with suitable metal halides such as a gallium halide or thallium halide, for example the iodides. It is convenient to irradiate with from 100 to 10,000 watt hours and preferably with from 500 to 5,000 watt hours per kilogram of chlorine. The light source may also be introduced into the reaction chamber, for example in the form of a submerged lamp. The reaction mixture may advantageously be exposed to light in a continuous flow reactor or in batches in a discontinuous method. The light source should conveniently provide broad light, if necessary by means of reflectors. Ullmanns Encyklopadie der technischen Chemie, volume I, pages 762 et seq., may be referred to for irradiation and light source details.

The reaction may be carried out as follows: Chlorine and sulfur dioxide are passed separately or, conveniently, mixed together, into propionic acid with or without a solvent while being exposed to light at the reaction temperature. The mixture is advantageously supplied while being irradiated and being mixed well so that it enters the irradiation zone as very fine bubbles. Reaction periods are generally from fifteen minutes to twenty-four hours and preferably from two to ten hours. When all the sulfur dioxide and chlorine has been passed in the light source is advantageously switched off and the reaction mixture is kept at the reaction temperature of the second stage for from one hour to two hours. The 3-sulfopropionic anhydride may be separated from the mixture by a conventional method, for example by distilling off the solvent, treating the residue with a suitable solvent such as benzene or a mixture of benzene and ligroin, followed by filtration. The production of sulfopropionic anhydride may also be carried out continuously by continuously removing from the irradiation zone a portion of the irradiated solution and subjecting it to subsequent heating at the reaction temperature of the second zone.

When the end product is worked up as described above by treatment with a solvent it may be obtained in a very finely divided or even an amorphous state so that filtration is impossible because the pores of the filter clog rapidly. In such cases the purity of the anhydride varies markedly from batch to batch and it is sometimes not suitable for further use. In a preferred embodiment the end product is separated from the reaction mixture by crystallization, the concentration of the end product in the mixture being up to 40 percent by weight, conveniently from 1 to 40 percent by weight and preferably from 5 to 30 percent by weight. This concentration can be achieved by dilution with one of the said solvents or by concentration of the mixture and can be monitored by analysis. It is particularly economical and at the same time very favorable for the formation of easily filterable crystals to use the mother liquor obtained in filtering off the sulfopropionic anhydride as a diluent for further crystallization of the anhydride. The procedure may therefore be as follows: a 40 to 90 percent by weight reaction mixture is first prepared by sulfochlorination of propionic acid, freed from residual gases and then diluted with such an amount of mother liquor from a previous crystallization batch that the abovementioned anhydride concentration is obtained. For crystallization the whole is cooled as a rule to +30° to −25°C and preferably to +20° to −15°C. The anhydride is precipitated in an easy filterable form and is conveniently suction filtered in the absence of moisture. The filtrate may be used in the described manner for further crystallizations.

In another preferred embodiment the end product is isolated from the reaction mixture by distillation in apparatus which promotes the formation of a large surface area of the liquid, for example by the one-pass evaporation, thin-layer evaporation, falling-film evaporation or molecular distillation method. Ullmann (loc. cit., 4th edition, volume 2, pages 655 et seq.) may be referred to for apparatus and distillation details. This embodiment is surprising because when the end product is distilled in a high vacuum by other conventional methods decomposition of the anhydride with liberation of sulfur dioxide often takes place at temperatures of at least 150°C. It is convenient to supply the mixture freed from reaction gases or the said crystallization mother liquors at 80° to 150°C and a pressure of from 0.01 to 5 mm to an evaporator working on one of the above principles. All the byproducts distil off and the anhydride collects as the distillation residue without decomposition and with a high degree of purity.

3-sulfopropionic anhydride prepared by the process of the invention is a valuable starting material for the production of dyes, pesticides and fibers. It is particularly suitable for the introduction of hydrophilic groups into dye precursors (U.S. Pat. No. 2,694,718) and as a component for the improvement of the coloration of polyesters (Japanese Printed application No. 8,229/1972). The abovementioned publications may be referred to for utility.

The following Examples illustrate the invention. The parts specified in the following Examples are by weight. They bear the same relation to parts by volume as the kilogram to the liter.

EXAMPLE 1

999 parts of propionic acid is introduced into a cylindrical reactor provided with a dip shaft of Duran glass and a gas inlet, and a mixture of 181 parts by volume of chlorine and 218 parts by volume of sulfur dioxide is passed in at 33°C over a period of seven hours while being irradiated with a 300 watt high pressure mercury vapor lamp. The mixture is then heated for another hour at 65°C without irradiation. The crude reaction mixture is metered through a valve to the top of a Sambay falling film evaporator operating at 120°C and 2 mm. 887 parts of 3-sulfopropionic anhydride (86.5 percent of theory) with a melting point of 74° to 76°C is obtained over a period of five hours in the receiver heated at 80°C at the bottom of the evaporator. 441 parts of propionic acid and 97 parts of α-chloropropionic acid are contained in the distillate.

EXAMPLE 2

In the manner described in Example 1 2,999 parts of propionic acid is reacted in two stages with 181 parts by volume of chlorine and 218 parts by volume of sulfur dioxide. The reaction mixture is then cooled from 65° to 15°C while stirring. 520 parts of 3-sulfopropionic anhydride having a melting point of 75° to 76°C crystallizes out and is separated from the mother liquor and dried. Another 240 parts of 3-sulfopropionic anhydride having a melting point of 73° to 76°C is obtained from the mother liquor by thin-layer evaporation at 110°C and 1.5 mm as described in Example 1.

We claim:

1. A process for the production of 3-sulfopropionic anhydride by reaction of propionic acid with chlorine and sulfur dioxide with exposure to light having a wavelength of from 1,800 to 8,000 A wherein the reaction is carried out with an amount of less than 1 mole of chlorine per mole of propionic acid and with an amount of sulfur dioxide which is from 0.95 to 7 times the weight of chlorine.

2. A process as claimed in claim 1 wherein the reaction is carried out in a first stage with exposure to light at a temperature of from −20° to +50°C and in a second stage without exposure to light at a temperature of more than 50°C.

3. A process as claimed in claim 1 wherein the reaction mixture obtained in the reaction is adjusted such that the concentration of end product is up to 40 percent by weight, the mixture is cooled to a temperature of from +30° to −25°C and the crystalline end product thus formed is isolated.

4. A process as claimed in claim 1 wherein the reaction mixture obtained in the reaction or the filtrate obtained after separating the crystallized end product is distilled at subatmospheric pressure at a temperature of less than 150°C by the one-pass evaporation, thin-layer evaporation, falling-film evaporation or molecular distillation method.

5. A process as claimed in claim 1 wherein the reaction is carried out with chlorine in an amount of from 0.3 to 0.95 mole per mole of propionic acid and an amount of sulfur dioxide which is from one time to four times the weight of chlorine.

6. A process as claimed in claim 1 wherein the reaction is carried out with chlorine in an amount of from 0.45 to 0.9 mole per mole of propionic acid and an amount of sulfur dioxide which is from one time to four times the weight of chlorine.

7. A process as claimed in claim 1 wherein the reaction is carried out in a first stage with exposure to light at a temperature of from 0° to 40°C and in a second stage without exposure to light at a temperature of from 60° to 80°C.

8. A process as claimed in claim 1 wherein the reaction is carried out in the presence of an organic solvent which is inert under the reaction conditions.

* * * * *